United States Patent
Chen et al.

(10) Patent No.: US 11,706,841 B2
(45) Date of Patent: Jul. 18, 2023

(54) PLUG-IN NETWORK DEVICE

(71) Applicant: Extreme Networks, Inc., San Jose, CA (US)

(72) Inventors: George Gang Chen, Fremont, CA (US); Edward Chee, Milpitas, CA (US); Gururaj Govindasamy, Milpitas, CA (US)

(73) Assignee: Extreme Networks, Inc., San Jose, CA (US)

( * ) Notice: Subject to any disclaimer, the term of this patent is extended or adjusted under 35 U.S.C. 154(b) by 207 days.

(21) Appl. No.: 17/099,136

(22) Filed: Nov. 16, 2020

(65) Prior Publication Data

US 2021/0084712 A1   Mar. 18, 2021

Related U.S. Application Data

(63) Continuation of application No. 16/351,516, filed on Mar. 13, 2019, now Pat. No. 10,856,361.

(60) Provisional application No. 62/641,946, filed on Mar. 12, 2018.

(51) Int. Cl.
| | |
|---|---|
| *H04M 1/00* | (2006.01) |
| *H04W 88/08* | (2009.01) |
| *H04L 69/08* | (2022.01) |
| *H04W 84/22* | (2009.01) |

(52) U.S. Cl.
CPC ............ *H04W 88/08* (2013.01); *H04L 69/08* (2013.01); *H04W 84/22* (2013.01)

(58) Field of Classification Search
CPC ... H04W 84/12; H04W 88/085; H04W 88/08; H04W 8/24; H04W 84/22; H04W 88/02; H04L 69/08
See application file for complete search history.

(56) References Cited

U.S. PATENT DOCUMENTS

| | | | |
|---|---|---|---|
| 10,856,361 B2 | 12/2020 | Chen et al. | |
| 2007/0197262 A1* | 8/2007 | Smith | H04L 12/2803 455/562.1 |
| 2018/0014270 A1* | 1/2018 | Kakani | G01S 5/08 |
| 2019/0124752 A1* | 4/2019 | Kelly | H05B 47/105 |

* cited by examiner

*Primary Examiner* — Nhan T Le
(74) *Attorney, Agent, or Firm* — Sterne, Kessler, Goldstein & Fox P.L.L.C.

(57) ABSTRACT

A plug-in network device is disclosed. The plug-in network device can be used in association with a network management system and an infrastructure network device. The plug-in network device includes two antenna arrays, one of which is up-facing and one of which is front-facing. The plug-in network device can achieve wireless communication with the infrastructure network device via the up-facing antenna array and provide network services to wireless stations through the front-facing antenna array. The network management system can manage both the infrastructure network device and the plug-in network device.

20 Claims, 7 Drawing Sheets

PLUG-IN NETWORK DEVICE

CROSS-REFERENCE TO RELATED APPLICATIONS

This application claims priority to U.S. Non-Provisional application Ser. No. 16/351,516, filed on Mar. 13, 2019, which claims priority to U.S. Provisional Application No. 62/641,946, filed on Mar. 12, 2018, the contents of each is hereby incorporated by reference.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is to be appreciated that the Detailed Description section, and not the Abstract sections, is intended to be used to interpret the claims. The Summary and Abstract sections may set forth one or more but not all example embodiments as contemplated by the inventor(s), and thus, are not intended to limit the appended claims in any way.

Figure 1:
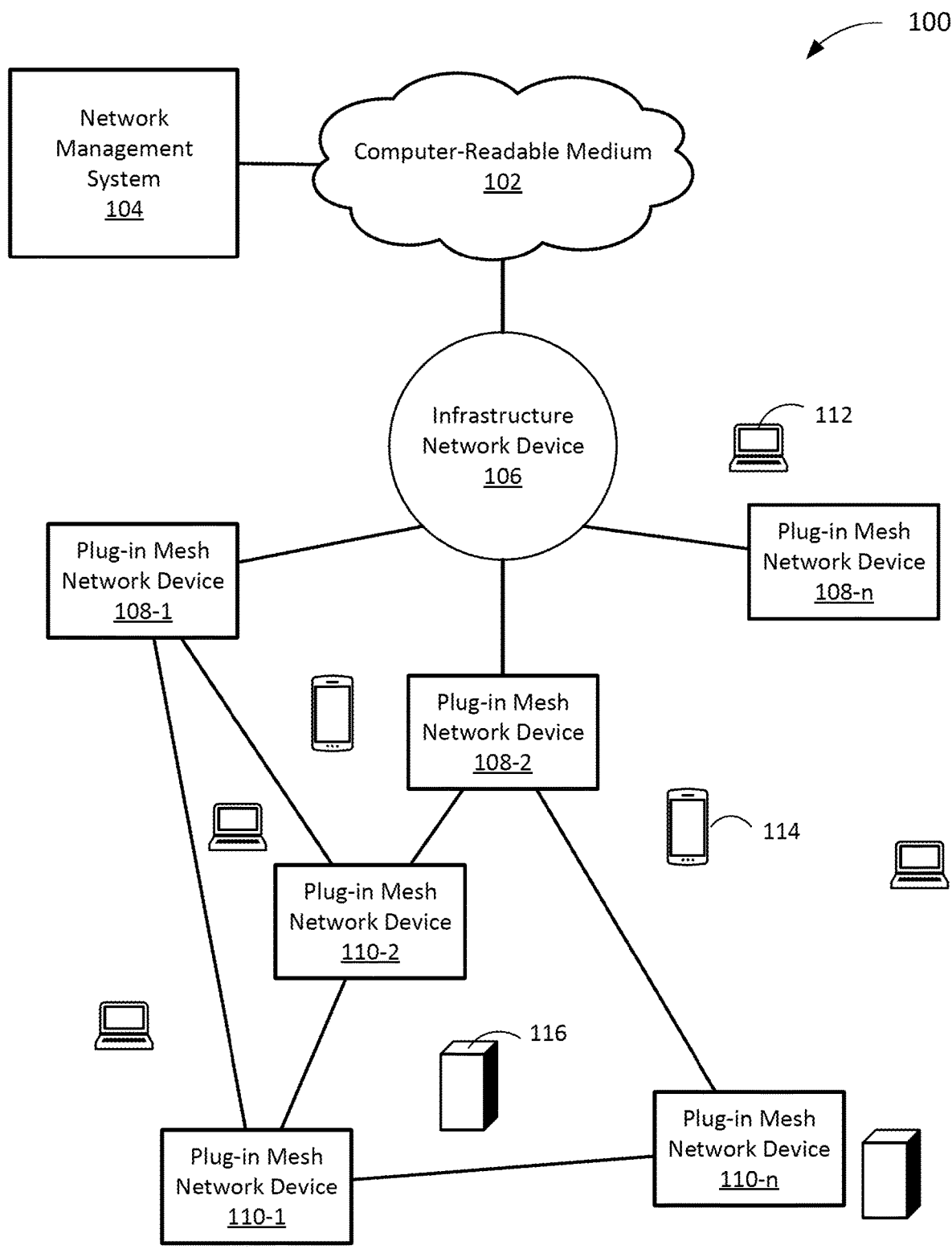
FIG. 1 is a diagram of an example of a network management system with plug-in mesh network devices.

FIG. 1 is a diagram 100 of an example of a network management system with plug-in mesh network devices. While network devices may be capable of functioning on a number of different networks, for illustrative utility in this paper, the network devices are assumed, unless otherwise indicated, to operate on an enterprise network and can therefore be characterized as a network device of the relevant enterprise network. Depending upon requirements, preferences, or other factors the network devices can be implemented as an access point (AP), gateway, router, bridge, switch, or some other applicable network device on the enterprise network. A network device can be implemented as a wireless AP (WAP) that operates in accordance with proprietary or standardized protocols.

The diagram 100 includes a computer-readable medium 102, a network management system 104 coupled to the computer-readable medium 102, an infrastructure network device 106 coupled to the computer-readable medium 102, plug-in mesh network devices 108-1 to 108-n (hereinafter the "plug-in mesh network devices 108), and optional plug-in mesh network devices 110-1 to 110-n (hereinafter the "optional plug-in mesh network devices 110). The diagram 100 also includes one or more wireless computing devices 112, one or more mobile phones 114, and one or more IoT (internet of things) devices 116, which are intended to represent end-user or edge-of-network devices.

In the example of FIG. 1, the computer-readable medium 102 is intended to represent a variety of potentially applicable technologies. For example, the computer-readable medium 102 can be used to form a network or part of a network. The term "network" can include a number of types of communications networks, such as the Internet, an infrastructure network, or the like. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, one or more other networks can include, for example, a wide area network (WAN), metropolitan area network (MAN), campus area network (CAN), local area network (LAN), personal area network (PAN), but the one or more other networks can at least theoretically be of any size or characterized in some other fashion (e.g., body area network (BAN), near-me area network (NAN), home area network (HAN), vehicle area network (VAN), or Internet area network (IAN), to name a couple of alternatives).

Networks can include enterprise private networks and virtual private networks (collectively, "private networks"). As the name suggests, private networks are under the control of a single entity. Private networks can include a head office and optional regional offices (collectively, offices). Many offices enable remote users to connect to the private network offices via some other network, such as the Internet. One or more other networks, as described in this paper, may or may not include a private network(s). In specific implementations, networks can be implemented as a WAN, public switched telephone network (PSTN), cellular network, or some other network or combination of similar or different networks capable of coupling two private networks. For illustrative simplicity, the term "enterprise network" is intended to encompass any network or subnet under the control of a single party, regardless of whether the party would be referred to as a "home owner" or a "business."

Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable. As used in this paper, a "computer readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the network management system 104 and applicable systems, engines, or devices described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users (e.g., human agents and/or artificial agents) can access the protocols of the cloud-based computing system through a web browser or other container application located on their client device.

A computer system can be implemented as an engine, as part of an engine or through multiple engines. As used in this paper, an engine includes at least two components: 1) a dedicated or shared hardware processor and 2) hardware, firmware, and/or software modules that are executed by the hardware processor. Depending upon implementation-specific or other considerations, an engine can be centralized or its functionality distributed. An engine can include special purpose hardware, firmware, or software embodied in a computer-readable medium for execution by the hardware processor. The hardware processor transforms state into new state using implemented data structures and methods and may include a software processor, but is not intended to represent a software processor sans hardware.

Applicable engines described in this paper, or the engines through which the systems and devices described in this paper can be implemented as cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1, the network management system 104 is intended to represent a system for managing at least one or more network devices comprising a wireless LAN (WLAN) at a physical location such as a building, one or more floors of a building, an outdoor venue, or the like, which are coupled to a wired backbone of an enterprise network (though the backbone could also be wireless); stations can associate with the WLAN to gain access to services on a network device to which they are coupled or from the backbone through the network device. A wireless network can refer to, by way of example but not limitation, to an infrastructure network, an ad hoc network, or some other applicable wireless network. Data on a wireless network is often encrypted, but can be sent in the clear if desired. The stations, network devices, and more generally any device connected to a network, can be referred to as "on" the network.

Depending upon implementation-specific factors, a station can be characterized as a device with a media access control (MAC) address and a physical layer (PHY) interface to a wireless medium that complies with the IEEE 802.11 standards. IEEE 802.11a-1999, IEEE 802.11b-1999, IEEE 802.11g-2003, IEEE 802.11-2007, IEEE 802.11n TGn Draft 8.0 (2009), and IEEE 802.11ac are incorporated by reference. As used in this paper, a system or device that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

Depending upon implementation-specific factors, an AP can be characterized as a network device that is used to enable a wireless communication channel in compliance with the IEEE 802.15 standards such as IEEE 801.15.1 (e.g., Bluetooth), IEEE 801.15.4 (e.g., ZigBee), etc.

Depending upon implementation-specific factors, an AP can be characterized as a network device that is used to enable a communication channel in compliance with the IEEE 802.3 standards. IEEE 802.3 is a working group and a collection of IEEE standards produced by the working group defining the physical layer and data link layer's MAC of wired Ethernet. This is generally a LAN technology with some WAN applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing WLAN computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In the example of FIG. 1, the network management system 104 is intended to represent hardware configured to manage configuration, topology, and/or analytics of one or more WLANs, at least one of which includes the infrastructure network device 106. The network management system 104, or a portion thereof, may be provided through a cloud-based platform, provided through a web server, distributed across multiple devices such as the infrastructure network device 106, or provided through some other mechanism. Accordingly, depending upon implementation- and/or configuration-specific factors, the functionality ascribed to the network management system 104 above could be characterized as being performed by the infrastructure network device 106. In a specific implementation, the network management system 104 is capable of onboarding plug-in network devices, as is discussed in more detail later.

In an alternative, the network management system 104 is configured to establish an admin-designated topology of a WLAN other than mesh topology. The applicable WLAN topology may include daisy chain (ring topology), star topology, line topology, tree topology, fully-connected topology, and combination thereof (and a combination thereof with mesh topology). Thus, there are multiple alternatives to mesh that can take advantage of the techniques described in this paper. It may be noted the plug-in mesh network devices 108 and 110 are referred to as "mesh" because that is what is depicted in the example of FIG. 1, but an appropriate term could be used in place of mesh, depending upon implementation- and/or configuration-specific factors.

The network management system 104, or a portion thereof, may be provided through a cloud-based platform, provided through a web server, distributed across multiple devices such as the infrastructure network device 106, or provided through some other mechanism. Accordingly, depending upon implementation- and/or configuration-specific factors, the functionality ascribed to the network management system 104, or any of it, could be characterized as being performed by the infrastructure network device 106.

In the example of FIG. 1, the infrastructure network device 106 is intended to represent a network device physically present at a location associated with a specific LAN of an enterprise network. The infrastructure network device 106 may be one of multiple network devices (not shown) that are physically present at the location associated with the specific LAN of the enterprise network. The infrastructure network device 106 may be one of multiple different network devices (not shown) that are physically present at multiple different locations associated with respective multiple different specific LANs of the enterprise network. In alternative implementations, the infrastructure network device 106 can be a network device of a HAN or a VAN, and may not be part of an extended service set (ESS) more typical in enterprise networks. It should be understood enterprise networks can comprise a single basic service set (BSS) and the terms ESS and BSS are implementation-specific, so alternative terms that capture the concept of an extended network with multiple local networks can be used where appropriate.

In a specific implementation, the infrastructure network device 106 includes a WAP that functions as a gateway between a WLAN and a backbone network. The infrastructure network device 106 is intended to represent a device capable of wireless communication with stations within a communication range of the infrastructure network device 106. In an example of operation, a station attempts to authenticate with the infrastructure network device 106. A wireless authentication engine implemented on the infrastructure network device 106 or accessible through the backbone network enables the station to be authenticated, resulting in the station being granted access to one or more services from a service provisioning engine (or one or more service provisioning engines) and the service provisioning engine requires a second authentication process. Alternatively, a sign-on authentication engine can perform the authentication on behalf of the station such that the station must only (from the perspective of the station) authenticate once.

In a specific implementation, the infrastructure network device 106 is provided at a high position such as a ceiling of a room such that wireless signals can be propagated therefrom and received thereby from a location that is generally out-of-the-way, but with advantageous line-of-sight (LOS) and minimal interference from physical objects. For example, in an office floor having a hallway and a plurality of individual offices connected to the hallway, the infrastructure network device 106 is provided at a ceiling of the hallway. In another example, in a home space having a living room around which several bedrooms are located, the infrastructure network device 106 is provided at a high wall position of the living room. In some locations, such as in a vehicle, the height of the infrastructure network device 106 is generally considered to be less consequential. For example, the infrastructure network device 106 would likely be installed in the dashboard area of a vehicle, as opposed to the ceiling, though the higher mount may still be considered sufficiently superior to put the infrastructure network device 106 there.

In a specific implementation, the infrastructure network device 106 is configured to maintain identification information of the infrastructure network device 106, such as serial number and/or MAC address, of the infrastructure network device 106 and unique credential information (e.g., default credential information) for other stations on the network. To establish a wireless connection, stations send credential information of the infrastructure network device 106, and the infrastructure network device 106 compares credential information maintained therein and the credential information received from the stations for authentication. Some network devices can authenticate locally at the network device, while others must pass information through the backbone network for authentication at least in part at an Authentication, Authorization, and Accounting (AAA), e.g., a remote authentication dial-in user service (RADIUS), server. In a RADIUS implementation, network devices often have a RADIUS client component that communicates with the RADIUS server. RFC 2865 (authentication and authorization) and RFC 2866 (accounting) are incorporated herein by reference.

As is illustrated in the diagram 100, the infrastructure network device 106 is coupled to the plug-in mesh network devices 108. Depending on signal intensity of signal generated from the infrastructure network device 106, as well as other factors, the communication range of the infrastructure network device 106 may vary from a few feet to a few hundred feet, but the diagram 100 is not intended to illustrate scale or range. The line connecting the infrastructure network device 106 to the plug-in mesh network devices 108 in the diagram 100 is intended to represent a direct communication link, so the plug-in mesh network devices 108 are assumed to be within range of the infrastructure network device 106 (and any equivalent devices that are not in range or are coupled to the infrastructure network device 106 through a repeater or an indirect communication link are excluded from the plug-in mesh network devices 108).

In the example of FIG. 1, the plug-in mesh network devices 108 are intended to represent network devices capable of extending the reach or range of the infrastructure network device 106 without simply acting as a repeater. For example, the plug-in mesh network devices 108 can have functionality normally attributed to a smart AP, or at least a node that does more than acting solely as a bridge for data passing through it. In a specific implementation, the plug-in mesh network devices 108 are capable of communicating with one another, if within range, through a direct communication link therebetween, though this is not shown in the diagram 100. Alternatively or in addition, the plug-in mesh network devices 108 are capable of communicating with infrastructure network devices (not shown) other than the infrastructure network device 106, and which may be on the same network or subnetwork as the infrastructure network device 106 or on another network and subnetwork.

In a specific implementation, the plug-in mesh network devices 108 are provided at positions lower than the infrastructure network device 106. For example, in an office floor having a hallway and a plurality of individual offices connected to the hallway, the infrastructure network device 106 are located near floor level in individual offices of the office floor. In another example, in a home space having a living room around which several bedrooms are located, the plug-in mesh network devices 108 are located near floor level of the bedrooms. One reason for positioning the plug-in mesh network devices 108 at near floor level is that is the location of electrical outlets.

In a specific implementation, the plug-in mesh network devices 108 are configured to wirelessly transmit authentication information thereof such that the plug-in mesh network devices 108 are introduced into the WLAN of the infrastructure network device 106. In a specific implementation, the authentication information includes identification information of the plug-in mesh network devices 108, such as serial number and/or MAC address. In a specific implementation, the plug-in mesh network devices 108 are configured to transmit the authentication information in response to applicable triggering events, such as power on (e.g., switch on, plug-in, etc.) of the plug-in mesh network devices 108 and specific user operations of the plug-in mesh network devices 108 (e.g., switching the device to "on," pressing the "done" button in an app, etc.). In a specific implementation, a typical authentication process may be obviated by using a pre-shared key (PSK) known at both ends of the link or SSL (Secure Socket Layer) based on public/private key mechanism, which can improve security by eliminating the need to authenticate wirelessly.

In a specific implementation, the plug-in mesh network devices 108 are configured to maintain identification information of the plug-in mesh network devices 108 (e.g., serial number and/or MAC address) and unique credential information (e.g., default credential information) for stations with which they are in communication in operation. To establish a wireless connection, stations can send credential information, which the plug-in mesh network devices 108 compare to credential information maintained therein for authentication and/or authorization purposes.

In the example of FIG. 1, the optional plug-in mesh network devices 110 are not within range of the infrastructure network device 106 and/or the infrastructure network device 106 is not within range of the optional plug-in mesh network devices 110. Alternatively or in addition, there may be a reason unrelated to range to deny a direct connection between the optional plug-in mesh network devices 110 and the infrastructure network device 106. The optional plug-in mesh network devices 110 can be onboarded in a manner similar to that described above with reference to the plug-in mesh network devices 108, but with an additional hop to reach the network management system 104 (unless, of course, relevant functionality of the network management system 104 is on the plug-in mesh network devices 108, or at least a relevant one of them). The functionality of the plug-in mesh network devices 108 and the optional plug-in mesh network devices 110 may or may not be the same. The optional plug-in mesh network devices 110 are optional because it may be desirable to limit network devices to those that can have a direct wireless connection with the infrastructure network device 106. The optional plug-in mesh network devices 110 could also be replaced with repeaters.

For illustrative purposes, wireless computing devices 112, mobile phones 114, and Internet of Things (IoT) devices 116 are depicted in the diagram 100. These devices are not intended to limit the type of stations that could be on the WLAN associated with the infrastructure network device 106. The wireless computing devices 112 are intended to represent one or more end-node wireless communication devices configured to perform short-range wireless communication, such as personal computers (e.g., desktop computers and laptop computer), tablets, smart watches, game consoles, and so on. The mobile phones 114 are intended to represent one or more end-node wireless communication devices configured to perform long-range wireless communication as well as short-range wireless communication, such as smartphones, tablets, smart watches, and so on, if they are implemented with long-range capabilities. The IoT devices 116 are intended to represent one or more end-node wireless communication devices configured to perform short-range (and sometimes long-range) wireless communication for specific purposes, such as smart speaker, smart thermostat, smart home security device, smart garage opener, smart TV, smart vehicle, smart home appliance, smart wearable devices, and so on. While the diagram 100 does not include lines connecting the wireless computing devices 112, the mobile phones 114, and the IoT devices 116 to the network devices, they are intended to represent stations that will establish wireless links with one or more of the network devices in operation. Because the plug-in mesh network devices 108 and 110 are not simply bridges, it is not necessarily the case that the network management system 104 will prefer stations authenticate with upstream network devices because downstream network devices may have functionality adequate to reduce upstream traffic, making load balancing more desirable than would typically be the case for a mesh where some nodes are simply repeaters.

Figure 2:
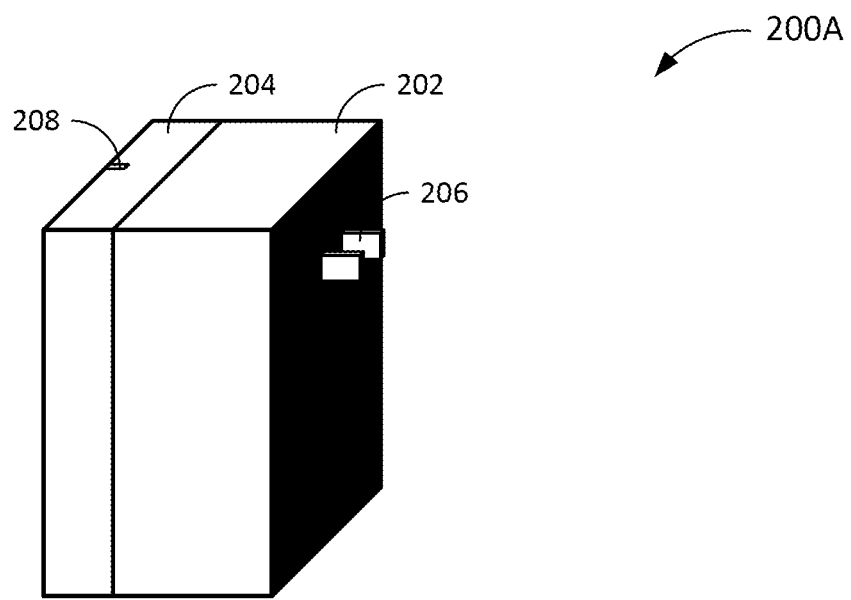
FIG. 2 depicts diagrams of perspective views of an example of a plug-in network device.
Figure 2:
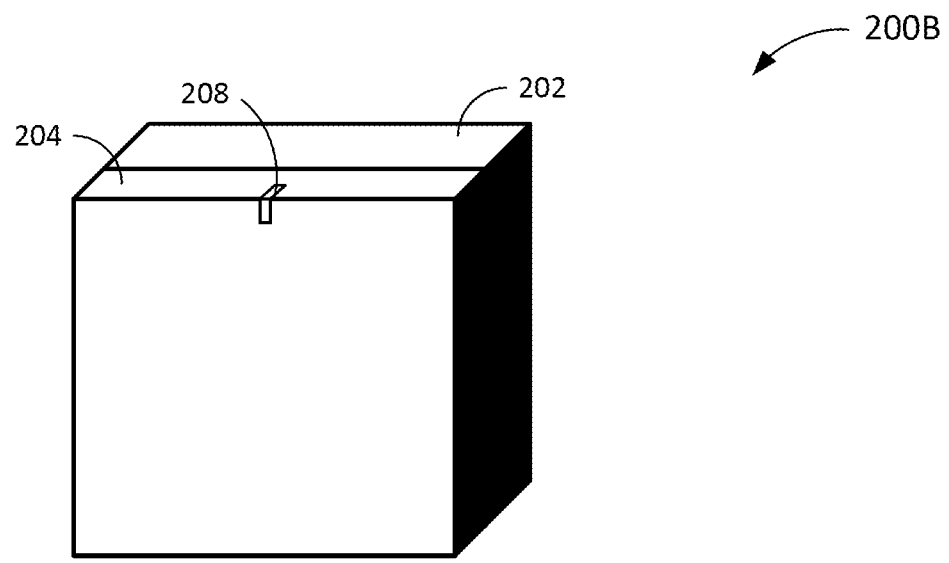

FIG. 2 depicts diagram 200A and 200B (collectively, the "diagrams 200") of an example of a plug-in network device. Diagram 200A shows a rear side of the plug-in network device and diagram 200B shows a front side of the plug-in network device. The diagrams 200 include a rear housing 202, a front housing 204 connected to the rear housing 202, an alternating current (AC) power plug 206 extending from the rear housing 202, and a state indicator 208 on an upper portion of the front housing 204.

In the example of FIG. 2, the rear housing 202 is intended to represent a part of a housing of the plug-in network device on a side (rear side) that is intended to face a wall with an AC power socket. In a specific implementation, electronic components to cause the plug-in network device to function as a WAP are accommodated in the rear housing 202. In such an implementation, the plug-in network device can be characterized as a plug-in WAP. Specific electronic components of a plug-in network device will be described with reference to FIG. 3 below.

In a specific implementation, the rear housing 202 includes an engagement mechanism (not shown in FIG. 2) to be engaged with the front housing 204. Depending on a specific implementation, the engagement mechanism may include a latch structure to removably fix the front housing 204 to the rear housing 202. The engagement mechanism may or may not include one or more engagement surfaces that are configured to be flush with one or more engagement surfaces of the front housing 204. For example, the rear housing 202 may include a male or female engagement mechanism that is coupled to a female or male engagement mechanism of the front housing 204.

In the example of FIG. 2, the front housing 204 is intended to represent a part of a housing of the plug-in network device on a side (front side) that is intended to face away from a wall with an AC power socket. In a specific implementation, electronic components to cause the plug-in network device to function as a WAP are accommodated in the front housing 204. (The electronic components can also be distributed between the front housing 204 and the rear housing 202.)

The rear housing 202 and the front housing 204 have a shape suitable for coupling to an AC power socket on a wall. For example, the rear housing 202 can be formed in a substantially cuboid shape with a square front and rear face where the length of each side of the square is 50-80 mm (e.g., 72 mm), and rectangular sides with a width of about 20-45 mm (e.g., 42 mm) measured across both the rear housing 202 and the front housing 204 when the plug-in network device is assembled. The rear housing 202 and the front housing 204 are formed of applicable materials to be safe and sturdy enough for affixing to a wall. For example, the rear housing 202 and the front housing 204 can be formed of dielectric materials such as resin and/or conductive materials such as metal. In a specific implementation, the plug-in network device has a weight that is suitable to affix to a wall. For example, in a specific implementation, the plug-in network device weighs 100-300 g.

In the example of FIG. 2, the rear housing 202 has slots formed in the upper wall-facing surface to allow prongs of the AC power plug 206 to extend therefrom. The AC power plug 206 could extend from some other applicable portion of the rear housing 202 than is depicted. The AC power plug 206 is intended to represent a male portion of a domestic or light commercial electrical connector. Depending on a country to be used, the shape of the AC power plug 206 may vary. It may be desirable to include multiple power sources, such as the AC power plug 206 and an internal battery so that if the plug-in network device is accidentally or unintentionally unplugged, the internal battery can allow the plug-in network device to continue to operate (presumably, in this example, until it is plugged back in).

The AC power plug 206 is for AC power because that is what is suitable for some common use cases, such as domestic and light commercial applications, and specifically because they can be plugged into ubiquitous wall sockets found in domestic and light commercial locations. Alternatively, the AC power plug 206 could be replaced with an industrial or multiphase plug and/or a direct current (DC) plug for use as a small coaxial connector, snap and lock DC power connectors, outdoor light systems connectors, airline in-seat power supply systems, powerpole connectors, SAE connectors, cigar lighter plugs, to name several. Instead or in addition to the AC power plug 206, the plug-in network device can include a LAN slot for connection with a wired communication device, a universal serial bus (USB) of applicable versions (e.g., Type-A, Type-B, Type-C, USB 2.0, USB 3.0, USB 3.1, USB 3.2, mini/micro USB, etc.) for data communication and/or power supply/charging, or some other applicable connector that can provide data, power, or both. Some of these alternatives or additions may be more conveniently located on the front housing 204 than the rear housing 202.

In the example of FIG. 2, the state indicator 208 is intended to represent an indicator, such as a light-emitting diode (LED) formed in the front housing 204. In a specific implementation, the state indicator 208 is configured to indicate an operational and/or connection state of the plug-in network device. The state indicator 208 may be configured to indicate different status depending upon flash pattern or color. For example, a green light might indicate the plug-in network device has sufficient power, while a red light might indicate the plug-in network device is note receiving adequate power (e.g., when the plug-in network device is accidentally unplugged). As another example, a green light might indicate a link has been established with another network device and a flashing green light might indicate the link has been established, but the plug-in network device is not receiving adequate power. The status indicator 208 can also be implemented using multiple distinct indicators, such as three LEDs in a row that indicate different status (e.g., one for power, one for configuration, and one for link status). Depending upon implementation- and/or configuration-specific factors, the status indicator 208 can be augmented with audio, which may or may not also include forming openings in the rear housing 202 or the front housing 204. Depending on a specific implementation, the audio signals may include a beep sound and/or a human voice announcement, such as "please plug me back in" or "the fire alarm has been triggered on the third floor."

Figure 3:
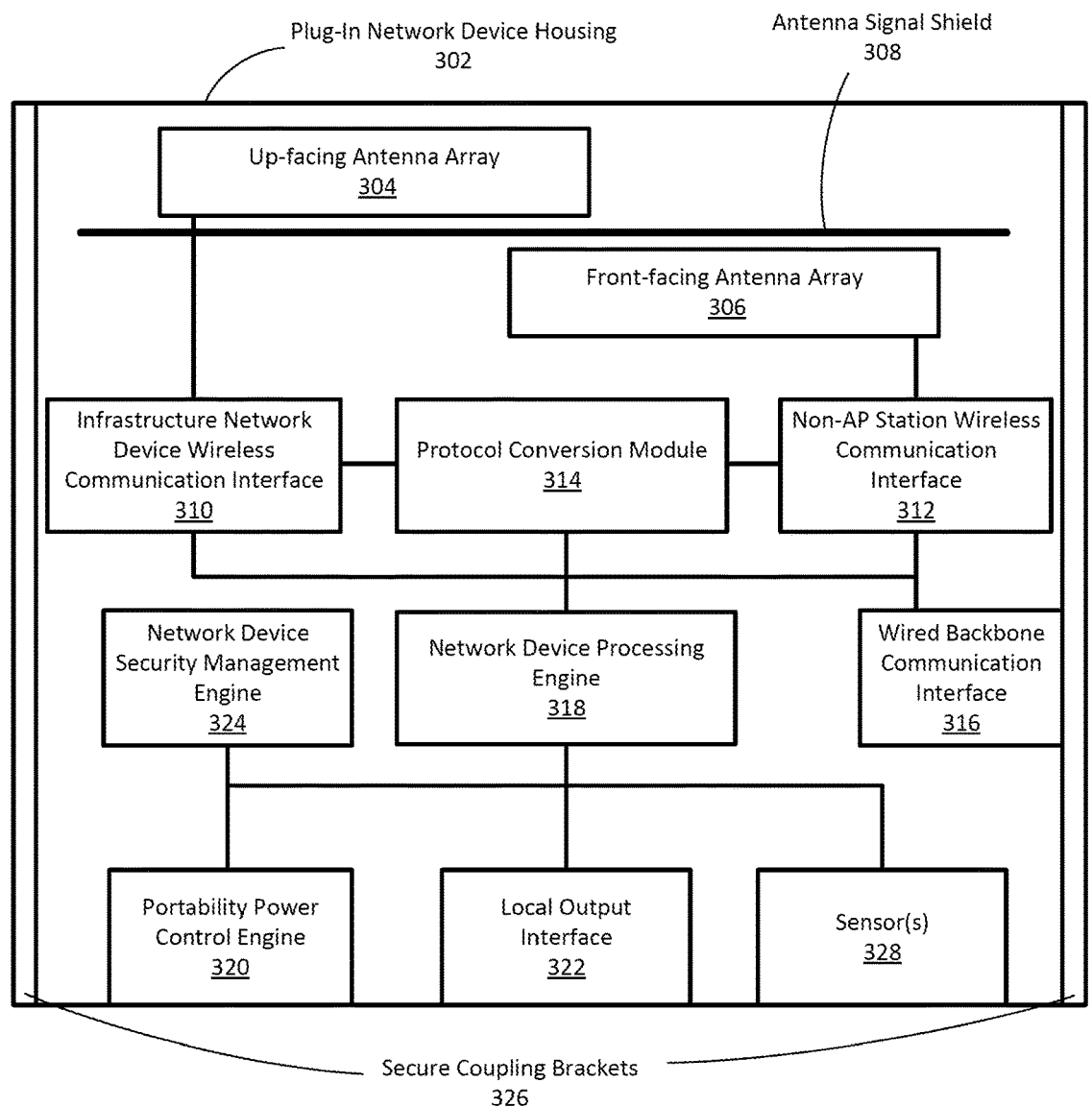
FIG. 3 is a diagram of an example of plug-in network device components.

FIG. 3 is a diagram 300 of an example of plug-in network device components. The diagram 300 includes a plug-in network device housing 302, an up-facing antenna array 304 coupled to the plug-in network device housing 302, a front-facing antenna array 306 coupled to the plug-in network device housing 302, an antenna signal shield 308 coupled to the plug-in network device housing between the up-facing antenna array 304 and the front-facing antenna array 306, an infrastructure network device wireless communication interface 310 coupled to the up-facing antenna array 304, a non-AP wireless communication interface 312 coupled to the front-facing antenna array 306, a protocol conversion module 314 coupled to the infrastructure network device wireless communication interface 310 and the non-AP wireless communication interface 312, a wired backbone communication interface 316 coupled to the protocol conversion module 314, a network device processing engine 318 coupled to the infrastructure network device wireless communication interface 310, the non-AP wireless communication interface 312, the protocol conversion module 314, and the wired backbone communication interface 316, a portability power control engine 320 coupled to the network device processing engine 316, a local output interface 322 coupled to the network device processing engine, a network device security management engine 324 coupled to the network device processing engine 316, and secure coupling brackets 326 coupled to the plug-in network device housing 302.

In the example of FIG. 3, the plug-in network device housing 302 is intended to represent an external body of the plug-in network device. In an alternative, the housing 302 is replaced with a frame or a board, but a housing will be desirable in at least some expected use cases.

In the example of FIG. 3, the up-facing antenna array 304 is intended to represent an array of antennas configured to send wireless signals to and receive wireless signals from an infrastructure network device. In a specific implementation, the up-facing antenna array 304 is provided at a portion of the plug-in network device higher than the front-facing antenna array 306 when the plug-in network device is plugged into an AC power socket (or some other applicable socket). In a specific implementation, the up-facing antenna array 304 is directed upward, which has the advantage of reducing signal interference from wireless activities associated with the front-facing antenna array 306. In a specific implementation, the up-facing antenna array 304 is prevented from transmitting signals downward so as to reduce interference at the front-facing antenna array 306. In a specific implementation, a directivity of wireless signals emitted from the up-facing antenna array 304 is limited to between $\pi/6$ radians and $\pi/2$ radians from horizontal, so as to effectively communicate with an infrastructure network device. ($\pi/2$ radians is assumed to be the upper bound because that is flush with the wall onto which the plug-in network device is presumed to be affixed, but the upward bound would likely increase to $5\pi/6$ radians if there were no wall, which is similar to saying above panoramic $\pi/6$ radians above horizontal.)

In the example of FIG. 3, the front-facing antenna array 306 is intended to represent an array of antennas configured to send wireless signals to and receive wireless signals from non-AP stations. In an alternative, the front-facing antenna array 306 can also send wireless signals to and receive wireless signals from other plug-in network devices. In a specific implementation, the front-facing antenna array 306 is provided at a portion of the plug-in network device lower than the up-facing antenna array 304 when the plug-in network device is plugged into an AC power socket (or some other applicable socket). In a specific implementation, the front-facing antenna array 306 is directed frontward (e.g., roughly parallel to the ground in a typical installation), which has the advantage of reducing signal interference from wireless activities associated with the up-facing antenna array 304. In a specific implementation, the front-facing antenna array 306 is prevented from transmitting signals upward so as to reduce interference at the up-facing antenna array 304. In a specific implementation, a directivity of wireless signals emitted from the front-facing antenna array 304 is limited to between $\pi/6$ radians and $-\pi/2$ radians from horizontal, so as to effectively communicate with non-AP stations or, if applicable, other plug-in network devices. ($\pi/2$ radians is assumed to be the lower bound because that is flush with the wall onto which the plug-in network device is presumed to be affixed, but the lower bound would likely decrease to $-7\pi/6$ radians if there were no wall, which is similar to saying below panoramic $\pi/6$ radians above horizontal.)

In the example of FIG. 3, the antenna signal shield 308 is intended to represent a signal shield member configured to shield the up-facing antenna array 304 from electromagnetic (EM) interference associated with the front-facing antenna array 306, and vice versa. The antenna signal shield 308 can also be characterized as a radio frequency (RF) shield. In a specific implementation, the antenna signal shield 308 is configured to absorb or reflect EM radiation emitted from the up-facing antenna array 304, such that received signal strength (RSS) at the front-facing antenna array 306 is reduced or, ideally, the signals are not detected at all. In a specific implementation, the antenna signal shield 308 is configured to absorb or reflect EM radiation emitted from the front-facing antenna array 306, such that the RSS at the up-facing antenna array 304 is reduced or, ideally, the signals are not detected at all. In a specific implementation, the antenna signal shield 308 is provided between the up-facing antenna array 304 and the front-facing antenna array 306 and extends in a roughly horizontal plane along the entire longitudinal side of the up-facing antenna array 304 and the entire longitudinal side of the front-facing antenna array 306. In a specific implementation, the antenna signal shield 308 is formed of a metal plate and/or a metal mesh having mesh size smaller than wavelengths of the wireless signals to be shielded. Examples of metal that can be used to form the antenna signal shield 308 include copper and/or nickel.

In the example of FIG. 3, the infrastructure network device wireless communication interface 310 is intended to represent a signal processing module (e.g., circuitry) configured to process signals received from the up-facing antenna array 304 into signals to be internally processed in the plug-in network device and generate signals to be propagated from the up-facing antenna array 304. Depending on a specific implementation, the infrastructure network device wireless communication interface 310 includes applicable circuit elements such as an amplifier, a phase shifter, a signal modulator, an analog-to-digital (AD) converter, and a digital-to-analog (DA) converter. For example, when the infrastructure network device wireless communication interface 310 receives wireless signals from the up-facing antenna array 304, the infrastructure network device wireless communication interface 310 generates a digital bit signal from the received wireless signals and provides to the protocol conversion module 314. In another example, when the infrastructure network device wireless communication interface 310 receives digital bit wireless signals from the protocol conversion module 314, the infrastructure network device wireless communication interface 310 generates an analog signal to be propagated from the up-facing antenna array 304.

In the example of FIG. 3, the non-AP station wireless communication interface 312 is intended to represent a signal processing module (e.g., circuitry) configured to process signals received from the front-facing antenna array 306 into signals to be internally processed in the plug-in network device and generate signals to be propagated from the front-facing antenna array 306. In a specific implementation, the non-AP station wireless communication interface 312 includes the same or similar circuit elements as the infrastructure network device wireless communication interface 310 and performs the same or similar signal processing, but for non-AP station communications instead of infrastructure network device communications. The term "non-AP station wireless communication interface" is intended to be short for "non-AP station and plug-in network device wireless communication interface" in an implementation that includes other plug-in network devices with which the plug-in network device depicted in the example of FIG. 3 can directly communicate.

In the example of FIG. 3, the protocol conversion module 314 is intended to represent circuitry for converting a signal from a first wireless communication protocol to a second wireless communication protocol. For example, a wireless communication protocol associated with the up-facing antenna array 304 may be different from a wireless communication protocol associated with the front-facing antenna array 306. In a specific implementation, the protocol conversion module 314 is configured to convert a signal compliant with a first IEEE 801.11 standard (e.g., IEEE 801.11b/g) to a signal compliant with a second IEEE 801.11 standard (e.g., IEEE 801.11ac), from 802.11 to 802.15, or to and from some other collection of protocols. Advantageously, the wireless communication protocol of wireless signals transmitted and received by the up-facing antenna array 304 can conform to a first protocol with a transmission rate that is lower than that of a second protocol associated with the front-facing antenna array 306, which can improve the overall performance of the WLAN. In a specific implementation, when the protocol conversion module 314 converts to a protocol, the protocol conversion module 314 is configured to convert (down-convert and/or up-convert) a frequency of the wireless signals. For example, when the protocol conversion module 314 converts from IEEE 801.11b/g to IEEE 801.11ac, the protocol conversion module 314 upconverts the frequency to 2.4 GHz to 5.0 GHz.

In a specific implementation, the protocol conversion module 314 is configured to convert a wire-based communication protocol employed by a wire-based communication through the wired backbone communication interface 316 to a wireless communication protocol for wireless communication through the up-facing antenna array 304 and/or the front-facing antenna array 306. For example, the wire-based communication can be compliant with the IEEE 802.3 standards.

In the example of FIG. 3, the wired backbone communication interface 316 is intended to represent circuitry for processing signals received through wires into signals to be internally processed in the plug-in network device and generate signals to be transmitted through antennas. In a specific implementation, the wired backbone communication interface 316 includes the same or similar circuit elements as the infrastructure network device wireless communication interface 310 and/or the non-AP station wireless communication interface 312, and performs the same or similar signal processing.

In the example of FIG. 3, the network device processing engine 318 is intended to represent a processing module configured to control the entire operation of the plug-in network device. In a specific implementation, the network device processing engine 318 drives the infrastructure network device wireless communication interface 310, the non-AP station wireless communication interface 312, and the wired backbone communication interface 368 to perform signal processing. In a specific implementation, the network device processing engine 318 causes the protocol conversion module 314 to perform protocol conversion as discussed above. In a specific implementation, the network device processing engine 318 causes the portability power control engine 320, the local output interface 322, and the network device security management engine 324 to perform their respective operations as discussed below.

In a specific implementation, the network device processing engine 318 is also configured to serve as a buffer. For example, when wireless communication is carried out via the up-facing antenna array 304 and the front-facing antenna array 306, via the up-facing antenna array 304 and the wired backbone communication interface 316, and via the front-facing antenna array 306 and the wired backbone communication interface 316, the network device processing engine 316 buffers datasets that are not yet ready to be transmitted therein. In another example, when data communication is carried out between and infrastructure network device and some other plug-in network devices or non-AP station, the network device processing engine 318 buffers datasets that are not yet ready to be transmitted.

In the example of FIG. 3, the portability power control engine 320 is intended to represent circuitry for controlling power supply to the plug-in network device. In a specific implementation, the portability power control engine 320 is configured to supply power to electronic components of the plug-in network device. In a specific implementation, the portability power control engine 320 is connectable to an electrical socket or any other applicable connector (e.g. USB, cigarette lighter receptacle, etc.) to receive power from an external power source (e.g., an electrical grid). In a specific implementation, the portability power control engine 320 is configured to store power therein. For example, the portability power control engine 320 is configured to accommodate non-detachable and/or detachable power storage or capacitance. In a specific implementation, the non-detachable power storage includes rechargeable battery, capacitors, or photovoltaic cells, to name a few. In a specific implementation, the detachable power storage includes rechargeable battery, non-rechargeable battery, or photovoltaic cells, to name a few. In a specific implementation, the portability power control engine 320 is configured to also supply power stored in power storage out of the plug-in network device, for example, to one or more stations, such as via a USB Type-C connector.

In the example of FIG. 3, the local output interface 322 is intended to represent circuitry for generating a notification output for applicable purposes. In a specific implementation, the notification output is light, a sound, an image, a multimedia stream, or a signal triggering one or more of these, to name several possibilities. In a specific implementation, the notification output is associated with an operational and/or connection state of the plug-in network device. In a specific implementation, the notification output can be for events that have nothing to do with the state of the plug-in network device, such as a tardy bell in a school, the location of a triggered motion sensor, or the like.

In the example of FIG. 3, the network device security management engine 324 is intended to represent circuitry for managing an authentication process of the plug-in network device for connection with stations and/or an authentication processes. In a specific implementation, the network device security management engine 324 is configured to cause the up-facing antenna array 304 (and maybe also the front-facing antenna array 306) to transmit authentication information of the plug-in network device, such that the plug-in network device is introduced into a WLAN when deployed. In a specific implementation, the authentication information includes identification information of the plug-in network device, such as serial number and/or MAC address. In a specific implementation, the network device security management engine 324 is configured to cause the up-facing antenna array 304 (and may be also the front-facing antenna array 306) to transmit the authentication information in response to applicable triggering events, such as power supply (e.g., switch on, plug-in, etc.) from the portability power control engine 320 and specific user operations of the plug-in network device.

In a specific implementation, the plug-in security management engine 324 is configured to maintain identification information of the plug-in network device, such as serial number and/or MAC address, of the plug-in network device and unique credential information (e.g., default credential information) for other stations. In a specific implementation, the network security management engine 324 is configured to assist in establishing a wireless connection with other stations. To establish the secure wireless connection, stations send credential information, which the network device security management engine 324 compares to credential information maintained therein or that can be provided to the network device security management engine 324 through an infrastructure network device.

In the example of FIG. 3, the secure coupling brackets 326 are intended to represent one or more mechanical, magnetic, and/or electrical modules employed to secure coupling of the plug-in network device to a predetermined position (e.g., an AC power socket on a wall). In a specific implementation, the secure coupling brackets 326 include one or more openings (e.g., holes) to receive fasteners such as screws or nails. In a specific implementation, the secure coupling brackets 326 are detachably coupled to the plug-in network device housing 302. Advantageously, especially where the plug-in network device receives power from external sources, it is desirable to prevent the plug-in network device from being inadvertently disconnected from the power supply. Even relatively flimsy secure coupling brackets 326 should signal to a human that the plug-in network device should not be unplugged, so there is no explicit requirement that the secure coupling brackets 326 be exceptionally robust, unless such an implementation is necessitated by factors that are atypical in a home or office installation.

In the example of FIG. 3, the sensor(s) 328 is intended to represent various applicable sensors such as a global positioning sensor (GPS), an accelerometer, a gyrometer, a motion sensor, a vibration sensor, a smell sensor (e.g., alcohol sensor), a sound (including ultrasonic) sensor, a thermometer, a hygrometer, a smoke detector, and so on. In a specific implementation, when the sensor(s) 328 detect an abnormal state, the sensor(s) 328 transmit an abnormality notification to the network device processing engine 318, such that the network device processing engine 318 uses the infrastructure network device wireless communication interface 310 to transmit the abnormality notification over the up-facing antenna array 304. In a specific implementation, the abnormality notification is transmitted to a network management system (for alerting an admin or other responsible party) and/or applicable entities (e.g., police, fire department, highway patrol, coast guard, aviation administration, amber alert, etc.).

Figure 4:
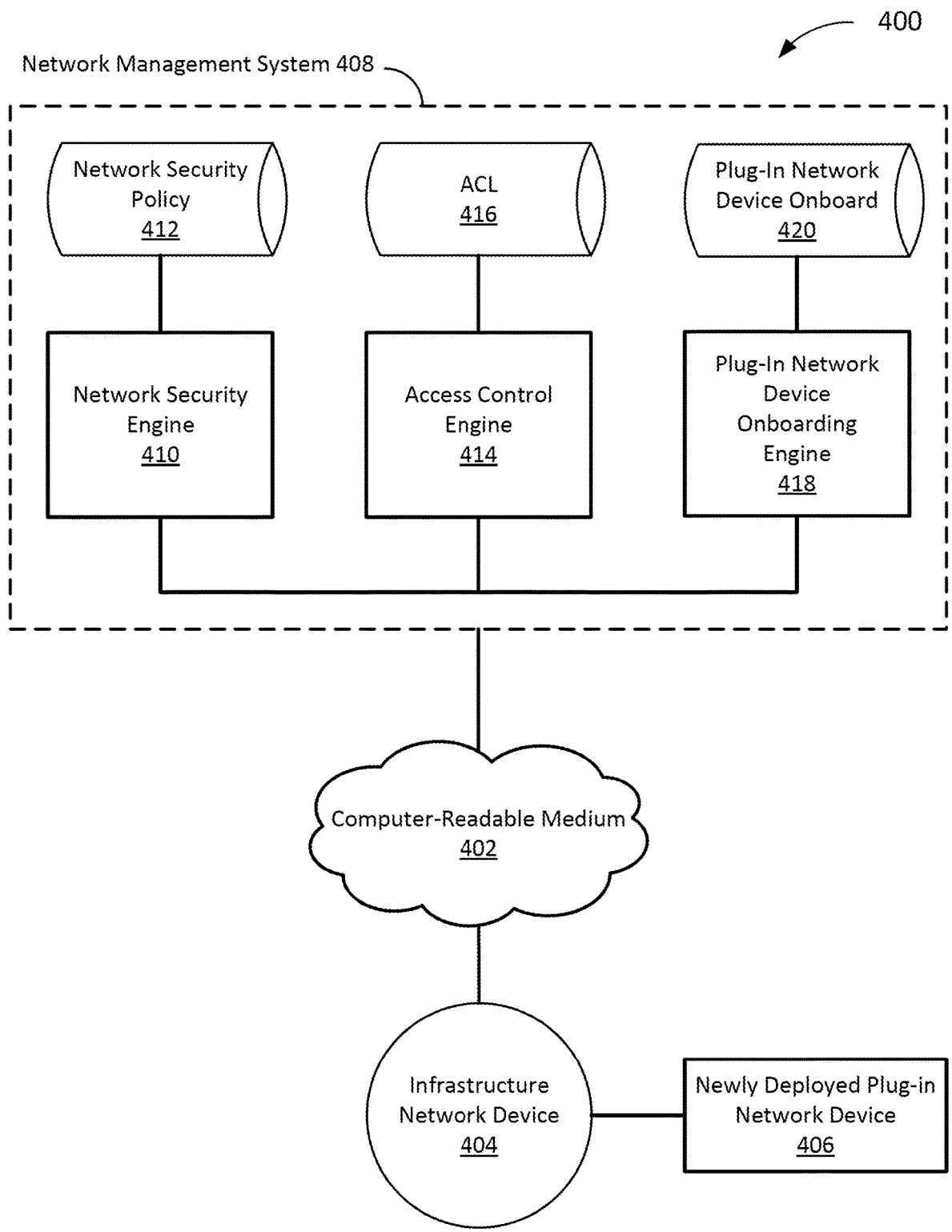
FIG. 4 is a diagram an example of a network management system for managing a private network with plug-in network devices.

FIG. 4 is a diagram 400 an example of a network management system for managing a private network with plug-in network devices. The diagram 400 includes a CRM 402, an infrastructure network device 404 coupled to the CRM 402, a newly deployed plug-in network device 406 coupled to the infrastructure network device 404, and a network management system 408 coupled to the CRM 402. The CRM 402, infrastructure network device 404, newly deployed plug-in network device 406, and network management system 408 can be implemented in a manner similar to that described with reference to the CRM 102, infrastructure network device 106, one or more of the plug-in network devices 108 or 110, and the network management system 104 of claim 1.

In the diagram 400, the network management system 408 includes a network security engine 410, network security policy datastore 412, access control engine 414, access control list (ACL) 416, plug-in network device onboarding engine 418, and plug-in network device onboarding datastore 420. End user devices can be introduced into a network from time to time. Most commercial networks find unacceptable a secure network that prevents any new devices from being onboarded. Some techniques for reducing risk include continuously monitoring for rogue devices and limiting some devices to subnets with reduced access, such as is typical for guest networks.

The network security engine 410 is intended to represent an engine that enforces network security policy, rules, or the like for an enterprise network that includes the infrastructure network device 404 and any stations with a wireless connection to the infrastructure network device 404. Depending on implementation- and/or configuration-specific factors, the network security engine 410 may deny establishment of a wireless communication link with new network devices and disestablish a pre-existing wireless communication link between network devices when such a wireless communication link is inferior to a preexisting path (e.g., one or more links). The applicable criteria for determining whether a link is inferior can include average throughput, total data traffic amount, frequency of data congestion (e.g., data drop off from buffer or time out of data packets), average communication cost, and so on.

The network security policy datastore 412 is intended to represent state, policy, rules, or the like used by the network security engine 410 to fulfill its role of providing network security. The network security policy datastore 412 may or may not have a security role for any device coupled to the enterprise network via the CRM 402, but for illustrative purposes of this example, devices other than the infrastructure network device 404 are omitted.

The access control engine 414 is intended to represent an engine for maintaining the ACL 416. An administrative agent, whether human or artificial, can add identifying information to the ACL 416, such as MAC address, source, destination, IP address, or some other parameter or combination of parameters to indicate a device should have access to services of a managed network. For infrastructure network devices in particular, this has historically been a manual task carried out by a systems administrator, though the process has been increasingly automated over time, and is an area that continues to be the subject of research and development efforts. The ACL 416 can be implemented in an appropriate manner, and can include datastores for technologies that use a term other than "ACL" to represent a white list of devices with access to the relevant network or subnetwork. The ACL 416 can also include a black list of devices that are prohibited access to the relevant network or subnetwork.

The plug-in network device onboarding engine 418 is intended to represent an engine that facilitates the onboarding of the newly deployed plug-in network device 408 using rules, keys, policies, or the like stored in the plug-in network device onboarding datastore 420 to authenticate and authorize the newly deployed plug-in network device 408. Advantageously, the plug-in network device onboarding engine 418 can onboard a plug-in network device that is not in the ACL 416 and that the network security policy 412 would normally prohibit but for the plug-in network device onboarding database 420 parameters, all while alleviating some of the security concerns.

In the example of FIG. 4, in operation, the network security engine 410 identifies a station at the infrastructure network device 404. The access control engine 414 determines whether the station is entitled to access post-authorization services of at least a subnet of the enterprise network. What is intended by the term "post-authorization services" is those services that would be provided to a device only after authorization is complete; devices are at least provided the "pre-authorization" service, but are generally not given access beyond pre-authorization services (or perhaps are given guest access) if the authorization fails. The plug-in network device onboarding engine 418 provides an additional service for devices that fail to gain access, which is a service to identify the device as a plug-in network device.

In a specific implementation, the newly deployed plug-in network device 406 has identification information (e.g., serial number, MAC address, pre-shared key, to name a few) that can be matched to parameters in the plug-in network device onboarding datastore 420, and, if applicable, authentication information, that the newly deployed plug-in network device 406 sends to the infrastructure network device 404 for use at the plug-in network device onboarding engine 418. (As a reminder, some or all of the network management system 408 can actually be implemented on the infrastructure network device 404.) In this specific implementation, the plug-in network device onboarding engine 418 matches at least the identifying information to identification parameters in the plug-in network device onboarding engine 420. The network management system 104 may or may not also compare identifying information of a deployed device, such as the infrastructure network device 404 or an intervening plug-in network device (not shown) and/or credentials associated therewith. This optional step can be used to ensure the newly-deployed plug-in network device 406 is in the right place, as a secondary authentication check, or for some other purpose. When the newly-deployed plug-in network device 406 is authenticated and/or authorized, the access control engine 414 can add the relevant information to the ACL 416 and/or the network security engine 410 can update the network security policy datastore 412, in addition to enabling the provisioning of network services through the newly-deployed plug-in network device 406. At this point, the newly deployed plug-in network device 406 may be considered no longer "newly deployed." Depending upon implementation- and/or configuration-specific factors, the plug-in network device onboarding engine 418 can be used to onboard plug-in network devices that are coupled to the infrastructure network device 404 via repeaters or other plug-in network devices.

The plug-in network device onboarding engine 418 can create, read, update, and delete (CRUD) the plug-in network device onboarding datastore 420. CRUD can be explicitly entered by human or artificial agents, derived from admin settings, or determined via some other mechanism. In such case, the plug-in network device onboarding engine 418 may maintain the new credential information therein and/or cause the network devices to update maintained credential information to the new credential information.

Figure 5:
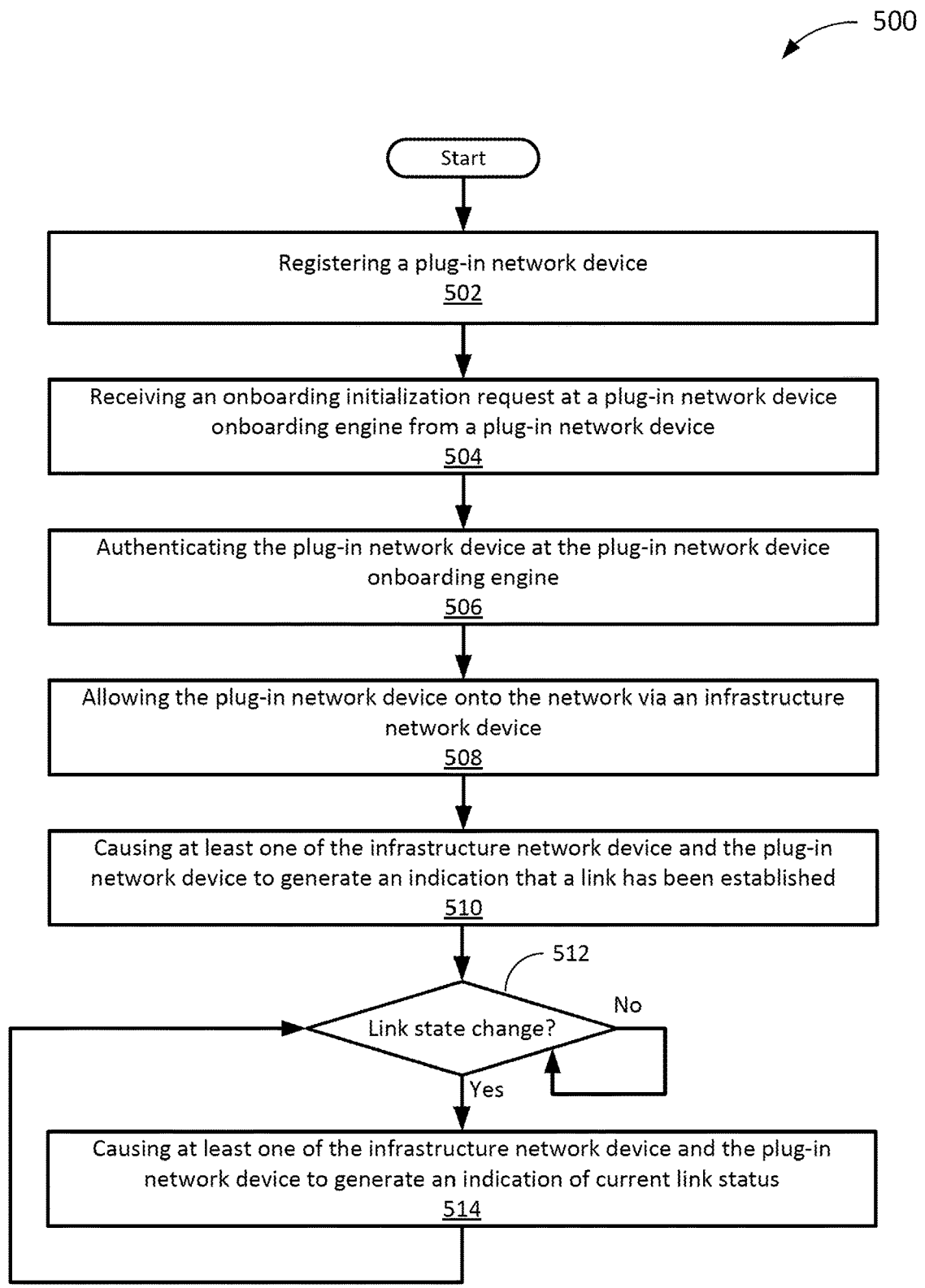
FIG. 5 is a flowchart of an example of a method for establishing a wireless communication link between a mother mesh AP and a child mesh AP in a local mesh-AP-based wireless communication network.

FIG. 5 is a flowchart 500 of an example of a method for establishing a wireless communication link between an infrastructure network device and a plug-in network device in a WLAN. This flowchart and the other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In the example of FIG. 5, the flowchart 500 begins at module 502, with registering a plug-in network device. In this example, registration of a plug-in network device is intended to represent a plug-in network device onboarding engine receiving registration information associated with the plug-in network device. In a specific implementation, registration is accomplished by a human or artificial agent of an enterprise network obtaining (e.g., reading, scanning, or receiving) the plug-in network device registration information and providing (e.g., entering, messaging, or transmitting) the registration information to the plug-in network device onboarding engine. Plug-in network device registration information can be provided on an internal or external surface of a plug-in network device (e.g., as a QR code, barcode, alphanumeric string, or the like) and/or electronically from an internal or external active or passive communication device (e.g., RFID tag, iBeacon, radio transmitter, or the like.) of the plug-in network device. In an alternative, the registration information is made available in packaging of the plug-in network device, via an application or web portal responsive to an agent responsible for installing the plug-in network device, or through some other avenue that makes the relevant registration information available to the relevant agent. In yet another alternative, a manufacturer, or a retailer or other party located between manufacturer and consumer in a supply chain, can provide the relevant registration information to the plug-in device onboarding engine when the plug-in network device is manufactured, shipped, sold, or at some other point in the product-to-consumer; the registration information can even be determined prior to manufacture, such is in the form of a Pre-Shared key (PSK). By registering the plug-in network device registration information, the plug-in network device onboarding engine is aware of a set of plug-in network devices—which may be limited to one network device depending upon implementation- and/or configuration-specific parameters—that are permitted to be onboarded. Registration information can be provided by more than one party. For example first registration data could be provided by a manufacturer, retailer, or service provider and second registration data could be provided by a human or artificial agent of an enterprise network, wherein the registration information includes the first registration data and the second registration data.

In a specific implementation, identification information and/or credential information of an infrastructure network device (e.g., an infrastructure WAP, an infrastructure repeater, or an infrastructure bridge) through which the plug-in network device is to establish a network connection. The infrastructure network device information may or may not be provided by the agent providing the plug-in network device registration information, and could be provided later. For example, the infrastructure network device information may be generated by the infrastructure network device when the plug-in network device communicates with the infrastructure network device (see below).

In the example of FIG. 5, the flowchart 500 continues to module 504, with, receiving an onboarding initialization request at a plug-in network device onboarding engine from a plug-in network device. In a specific implementation, the onboarding initialization request includes an authentication request that is sent to an infrastructure network device when a plug-in network device is powered on. As a preliminary step, the plug-in network device may be placed within range of the infrastructure network device, which may include a direct wireless connection (the devices must be within range of one another for two-way communication) or an indirect connection via repeaters, intervening subnets, or the like. The onboarding initialization request, which may include more than one datagram, packet, or message, includes authentication information that results in a match when compared with registration information in a plug-in network device onboarding engine accessible by a plug-in network device onboarding engine that performs the comparison.

The onboarding initialization request may follow installation of a plug-in network device. For example, the plug-in network device could be triggered to send the onboarding initialization request when it is plugged into a wall socket. Alternatively, the trigger could be a button press on the plug-in network device, user input on a handheld device of a human agent of the relevant enterprise network, sending an authentication request from plug-in network device to an infrastructure network device in accordance with a typical, e.g., 802.11 association process, or the like. In a specific implementation, the onboarding initialization request includes information in the header of an authentication request, such as a MAC address associated with a plug-in network device, which can be used in whole or in part to authorize the plug-in network device for onboarding.

In the example of FIG. 5, the flowchart 500 continues to module 506, with authenticating the plug-in network device at the plug-in network device onboarding engine. In a specific implementation, authenticating the plug-in network device includes obtaining plug-in network device registration information from a plug-in network device onboarding engine provided during registration (see, e.g., module 502) at an infrastructure network device and comparing the registration information to authentication information in an onboarding initialization request (see, e.g., module 504) received at the infrastructure network device. For example, the infrastructure network device can send a request for registration information to the plug-in network device onboarding engine and receive registration information from the plug-in network device onboarding engine. The registration information may or may not be explicitly associated with the infrastructure network device. As used here, "explicitly associated" means the registration information is for installing a plug-in network device identifiable with the registration information for communication through the infrastructure network device and with the enterprise network. When the plug-in network device authentication information, and the identification information and credential information of the infrastructure network device, if applicable, are matched to the registration information at the plug-in network device onboarding engine, the infrastructure network device can provide additional services through the plug-in network device.

It is assumed authenticating the plug-in network device at the plug-in network device onboarding engine is successful in the example of FIG. 5, but it may be worth noting unsuccessful authentication results in the plug-in network device not being authorized to act as a network device on, e.g., an enterprise network. In such a case, the plug-in network device may or may not be allowed to operate as a station on the WLAN, such as on a guest network or other subnet with reduced access to network resources. With the assumption authentication is successful, an access control engine may update an ACL to include the plug-in network device and/or a network security engine may update network security policy such that the plug-in network device is recognized as operating in accordance with policy. If registration information does not include the same parameters as are included in the ACL, the relevant parameters may be taken from authentication information received from the plug-in network device. For example, if registration information includes a PSK, but ACL includes MAC address, after a plug-in network device is onboarded, the access control engine can use a MAC address provided from the plug-in network device in an authentication request (or other message).

In the example of FIG. 5, the flowchart 500 continues to module 508, with allowing the plug-in network device onto the network via an infrastructure network device. In a specific implementation, the infrastructure network device received an authentication request from the plug-in network device (see, e.g., module 504) and the infrastructure network device responded. After a sequence of messages, e.g., a handshake, the plug-in network device is, at least in this example, onboarded and, more generally for stations, authenticated and allowed access to network services beyond onboarding and authentication services. When a device is "on the network," an ACL, if applicable, will include the device, and the device will have access to network services applicable to its VLAN, user rights, or other categorization identifiable using data provided from the plug-in network device (or through some other channel attributable to the plug-in network device). Notably, the plug-in network device can be onboarded onto a network without a wired connection (e.g., Ethernet connection) between an infrastructure network device and the plug-in network device.

In a specific implementation, an infrastructure network device sends a connection request to the plug-in network device after receipt of an authentication request from the plug-in network device, either during onboarding or after, and the plug-in network device returns an acknowledgment upon receiving the connection request. In a specific implementation, once a WLAN link is established, as long as the plug-in network device authentication information can be matched with registration information in a plug-in network device onboarding datastore, an ACL, or other applicable datastore, communication therethrough is carried out using pre-shared key (PSK) shared by both ends of the WLAN link, SSL (Secure Socket Layer) using public/private key encryption, or using some other mechanism suitable to maintain secrecy of communication. In this way, communication of credential information in the clear is prevented. As used here, "in the clear" means without encryption.

In the example of FIG. 5, the flowchart 500 continues to module 510, with causing at least one of the infrastructure network device and the plug-in network device to generate an indication that a link has been established. In a specific implementation, when the plug-in network device generates the indication, an applicable module such as the local output interface 322 (FIG. 3) generates the indication. In a specific implementation, the indication includes one or more of a light emission, an audio output, and an image output.

In the example of FIG. 5, the flowchart 500 continues to decision point 512 where it is determined whether link state change occurs. Link state change includes, for example, when a power supply is cut off to the plug-in network device, causing the plug-in network device indicator to turn off (a likely implementation if the plug-in device has no capacitance or battery to allow an electronic indicator to flash or sound) or to encourage a responsible party to re-establish a connection to a power supply and/or causing the infrastructure network device to encourage a responsible party to re-establish a connection to power for the plug-in network device. Because the plug-in network device may have an internal power supply, link state can include a prediction that a link will be disestablished in the future while the link is still established. An applicable module such as the local output interface 322 (FIG. 3) generates the indication that the link has been or may soon be disestablished.

If it is determined a link state change has not occurred (512-No), the flowchart 500 loops back to decision point 512. If, on the other hand, it is determined a state change has occurred (512-Yes), the flowchart 500 continues module 514 with causing at least one of the infrastructure network device and the plug-in network device to generate an indication of current link status. Current link status can include a variety of link states, such as no power, limited power (e.g., battery power only), lack of a WLAN connection, lack of a LAN connection, lack of a WAN connection, or some other limitation of the link. Link status can also include a non-error state, such as pairing, authenticating, connected, or the like. The flowchart 500 then returns to decision point 512 and continues as described previously.

Figure 6:
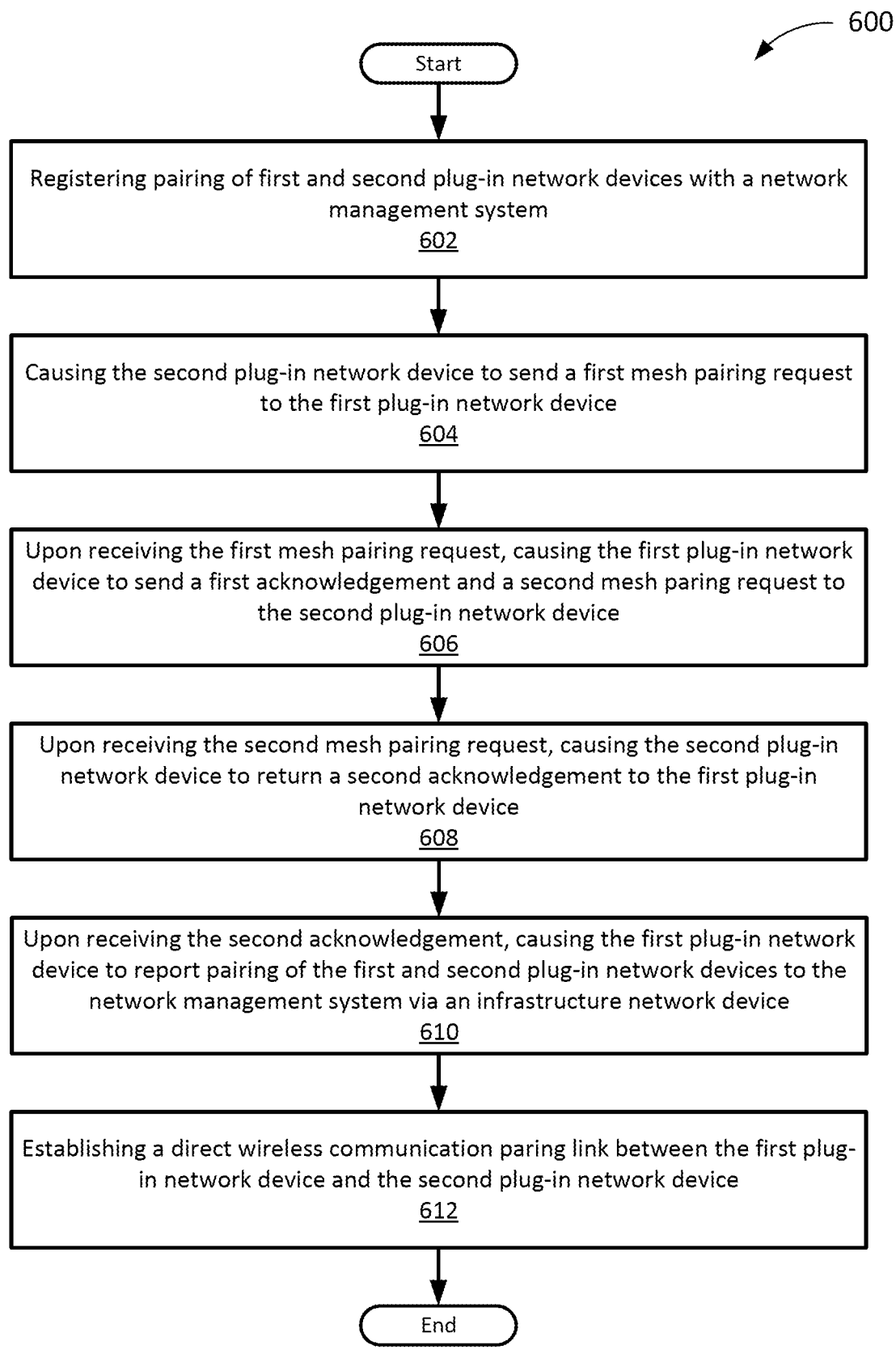
FIG. 6 is a flowchart of an example of a method for establishing a wireless communication link between a plug-in network device and a WLAN via an intervening plug-in network device.

FIG. 6 is a flowchart 600 of an example of a method for establishing a wireless communication link between a plug-in network device and a WLAN via an intervening plug-in network device. For illustrative purposes, a first plug-in network device is assumed to have been already connected to a mesh network and a second plug-in network device is connected to the mesh network by the end of the flowchart 600. In the example of FIG. 6, the flowchart 600 begins at module 602, with registering pairing of first and second plug-in network devices with a network management system. In a specific implementation, second plug-in network device authentication information such as a serial number and default credential number are indicated on the second plug-in network device and/or any applicable attachment of the second plug-in network device, and the second plug-in network device authentication information are registered to a network management system based on user input. In a specific implementation, identification information and credential information of the first plug-in network device is also registered to the network management system based on user input. Alternatively or in addition, identification information and credential information of an infrastructure network device is also registered to the network management system.

In the example of FIG. 6, the flowchart 600 continues to module 604, with causing the second plug-in network device to send a first mesh pairing request to the first plug-in network device. Depending upon implementation- and/or configuration-specific factors, the first mesh pairing request is sent immediately, shortly after, or some time after the second plug-in network device is powered on (e.g., plugged in); the power-on can act as a trigger for sending the first mesh pairing request. In a specific implementation, a network device security management engine such as the network device security management engine 324 (FIG. 3) of the second plug-in network device causes the first mesh pairing request to be sent to the first plug-in network device through a front-facing antenna such as the front-facing antenna array 306 (FIG. 3). In a specific implementation, the first mesh pairing request sent from the second plug-in network device includes identification information of the second plug-in network device. In a specific implementation, as a preliminary step, to establish a wireless communication link between the first plug-in network device and the second plug-in network device, the first plug-in network device and the second plug-in network device are powered on (e.g., plugged in) within range of one another.

In the example of FIG. 6, the flowchart 600 continues to module 606, with, upon receiving the first mesh pairing request, causing the first plug-in network device to send a first acknowledgment and a second mesh paring request to the second plug-in network device. In a specific implementation, a network device security management engine such as the network device security management engine 324 (FIG. 3) of the first plug-in network device causes the first acknowledgment second mesh pairing request to be sent to the second plug-in network device through a front-facing antenna such as the front-facing antenna array 306 (FIG. 3). In a specific implementation, the second mesh paring request sent from the first plug-in network device includes identification information of the first plug-in network device.

In the example of FIG. 6, the flowchart 600 continues to module 608, with, upon receiving the second mesh pairing request, causing the first plug-in network device to return a second acknowledgement to the second plug-in network device. In a specific implementation, a network device security management engine such as the network device security management engine 324 (FIG. 3) of the second plug-in network device causes the second acknowledgment to be sent to the first plug-in network device through a front-facing antenna such as the front-facing antenna array 306 (FIG. 3).

In the example of FIG. 6, the flowchart 600 continues to module 610, with, upon receiving the second acknowledgement, causing the first plug-in network device to report pairing of the first and second plug-in network devices to the network management system via an infrastructure network device. In a specific implementation, a network device security management engine such as the network device security management engine 324 (FIG. 3) of the first plug-in network device causes a report indicating the pairing of the first and second plug-in network devices to be sent to the infrastructure network device through an up-facing antenna such as the up-facing antenna array 304 (FIG. 3). In a specific implementation, the report includes identification information of the first and second plug-in network devices.

In the example of FIG. 6, the flowchart 600 continues to module 612, with establishing a direct wireless communication paring link between the first plug-in network device and the second plug-in network device. In a specific implementation, when the network management system receives the report, the network management system perform authorization of the pairing between the first plug-in network device and the second plug-in network device based on the report and pairing registration that have been made. In a specific implementation, when the pairing registration indicates paring between the first plug-in network device and the second plug-in network device, the network management system authorizes and establishes the paring between the first plug-in network device and the second plug-in network device.

Figure 7:
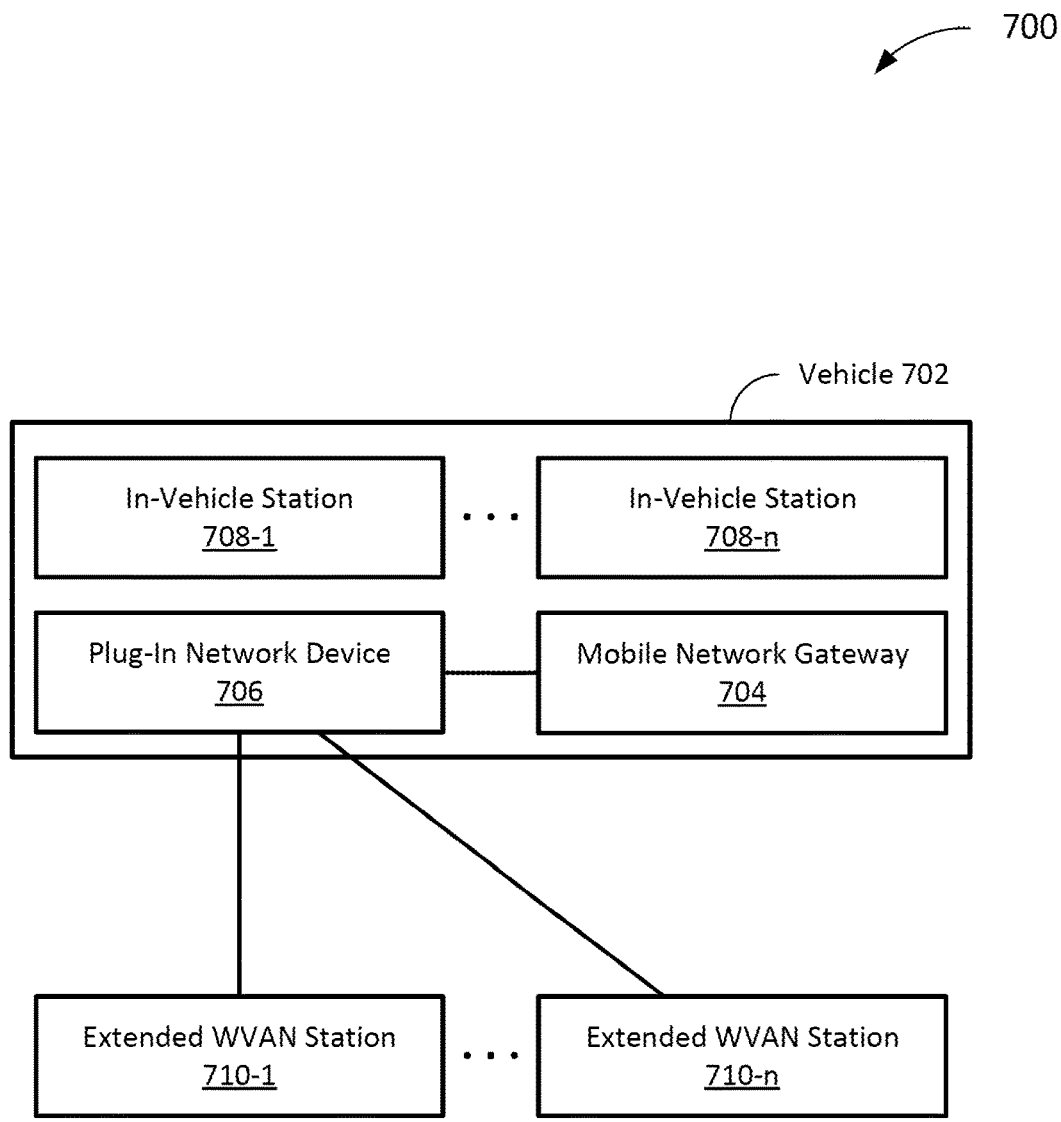
FIG. 7 is a diagram of an example of a mobile network with a plug-in network device-augmented WVAN.

FIG. 7 is a diagram 700 of an example of a plug-in network device-augmented WVAN. The system of the example of FIG. 7 includes a vehicle 702, a mobile network gateway 704 coupled to the vehicle 702, a detachable network device 706 coupled to the mobile network gateway 704, in-vehicle station 708-1 to in-vehicle station 708-*n* (collectively, the in-vehicle stations 708) coupled to the detachable network device 706, and extended WVAN station 710-1 to extended WVAN station 710-*n* (collectively, the extended WVAN stations 710) coupled to the detachable network device 706.

In the example of FIG. 7, the vehicle 702 is intended to represent a vehicle with a mobile network interface used to connect devices through a WLAN network device installed therein. The vehicle 702 can be implemented as an automobile, truck, bus, bike, or other ground transportation vehicle; an airplane, helicopter, or other air transportation vehicle; a boat, ship, or other water transportation vehicle; or any other vehicle. The type of implementation may have a bearing on the nature of the mobile network to which the vehicle 702 is coupled. For example, if the vehicle 702 is an automobile, a mobile network of land-based cellular base stations may suffice, while if the vehicle 702 is a ship, it may be desirable to make available maritime mobile satellite service in addition to (or instead of) maritime mobile service via coast and other ship stations.

In the example of FIG. 7, the mobile network gateway 704 is intended to represent a device installed in the vehicle 702 that includes a mobile network interface and an interface to a WVAN or WVAN network device. In a specific implementation, the mobile network gateway 704 provides an interface to a mobile network managed by commercial mobile wireless service providers, such as AT&T and Verizon. Some of the communication protocols used for mobile wireless communication include 2G, 3G, 4G, 4G LTE, LTE-Advanced, WiMAX, WiMAX2, 5G, and so on. The mobile network gateway 704 may or may not be detachable. For example, the mobile network gateway 704 could be integrated into the circuitry of the car, installed in the glove compartment, or plugged into a cigar lighter receptacle.

In the example of FIG. 7, the plug-in network device 706 is intended to represent a device installed in the vehicle 702 that includes a WVAN interface and an interface to the mobile network gateway 704. In a specific implementation, the plug-in network device 706 is managed by a network management system that may be accessible locally or via the mobile network gateway 704. (It is also possible to have a remote network management system that is not continuously connected, though a local agent would likely be implemented to handle at least some network management functionality in such an implementation, unless static rules are acceptable.) The plug-in network device 706 may include some physical security hardware designed to make it difficult to remove from the vehicle 702, or be installed in a relatively hidden location, such as a glove compartment or under the seat, but for illustrative purposes, the plug-in network device is assumed to be plugged into a power outlet of the vehicle 702, such as a cigar lighter receptacle, and located in a secure and/or convenient location, such as the dashboard, glove compartment, ceiling, instrument panel, or the like. In an implementation in which the mobile network gateway 704 includes a WLAN interface and a mobile interface, the plug-in network device 706 can be coupled to the mobile network gateway 704 wirelessly via a WLAN interface. Alternatively or in addition, the plug-in network device 706 can be coupled to the mobile network gateway 704 via a wired interface, such as Ethernet. The plug-in network device 704 and the mobile network gateway 704 can also be implemented as a single plug-in gateway device. In a specific implementation, the plug-in network device 706 extends the WVAN to up to 300 m, with decreased range under non-ideal conditions.

In a specific implementation, the plug-in network device 706 is configured to maintain identification information of stations, such as serial number and/or MAC address and unique credential information (e.g., default credential information) for stations to connect to the plug-in network device 706. In a specific implementation, the plug-in network device 706 is configured to establish a wireless end-node connection with stations. To establish the wireless end-node connection, stations send credential information of the plug-in network device 706, and the plug-in network device 706 compares credential information maintained therein and the credential information received from stations for authentication.

In the example of FIG. 7, the in-vehicle stations 708 are intended to represent wireless devices either carried in or around or installed in or on the vehicle 702. As such, the in-vehicle stations 708 can vary depending upon what passengers (with wireless devices) are in the vehicle 702. In an implementation in which the mobile network gateway 704 includes both a mobile network interface and a WVAN interface, the in-vehicle stations 708 can join the WVAN (assuming authorization et al. is successful) because the mobile network gateway would presumably have been designed to provide such access. However, network services provided via the mobile network gateway 704 can be inferior to those of more robust network devices.

In the example of FIG. 7, the extended WVAN stations 710 are intended to represent wireless devices that can be provided network services superior to those provided by the mobile network gateway 704 under given environmental conditions (e.g., considering congestion, range, etc.). Accordingly, the extended WVAN stations 710 are illustrated as coupled to the vehicle 702 via the plug-in network device 706. The in-vehicle stations 708 may or may not be coupled to the plug-in network device 706, as well, depending, for example, upon the capabilities of the mobile network gateway 704. The extended WVAN stations 710 can include end-user devices, IoT devices, and/or repeaters. IoT devices can include a global positioning system (GPS) devices, accelerometer, a gyrometer, a motion sensor, a vibration sensor, a smell sensor (e.g., alcohol sensor), a sound (including ultrasonic) sensor, a thermometer, a hygrometer, a smoke detector, and so on. In a specific implementation, when a sensor detects an abnormal state associated with abnormal events (e.g., accident, breakage, emergency) in or near the vehicle 702, the sensor transmits an abnormality notification to the plug-in network device 706 (and/or the mobile network gateway 704), such that the plug-in network device 706 (and/or the mobile network gateway 704) forwards the abnormality notification. In a specific implementation, the abnormality notification is transmitted to the in-vehicle stations 708, extended WVAN stations 710, and/or applicable entities (e.g., police, fire department, highway patrol, coast guard, aviation administration, amber alert, etc.).

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

What is claimed is:

1. A method, comprising:
   receiving, by a first plug-in network device, a first mesh pairing request from a second plug-in network device;
   in response to receiving the first mesh pairing request, sending, through a front-facing antenna of the first plug-in network device, a first acknowledgment and a second mesh paring request to the second first plug-in network device;
   receiving, by the first plug-in network device, a second acknowledgement from the second plug-in network device; and
   in response to receiving the second acknowledgement, transmitting, through an up-facing antenna of the first plug-in network device, a report indicating pairing of the first and second plug-in network devices to a network management system configured to establish a wireless communication pairing link between the first plug-in network device and the second plug-in network device.

2. The method of claim 1, wherein the first mesh pairing request includes identification information of the second plug-in network device.

3. The method of claim 1, wherein receiving the first mesh pairing request comprises receiving the first mesh pairing request in response to the first plug-in network device and the second plug-in network device being powered on within range of one another.

4. The method of claim 1, wherein the report includes identification information of the first and second plug-in network devices.

5. The method of claim 1, wherein the second mesh pairing request comprises identification information of the first plug-in network device.

6. The method of claim 1, wherein the first plug-in network device further comprises an antenna signal shield between the front-facing antenna and the up-facing antenna.

7. The method of claim 1, wherein receiving the first mesh pairing request from the second plug-in network device further comprises:
   sending the first mesh pairing request through a front-facing antenna of the second plug-in network device.

8. A system, comprising:
   a first plug-in network device;
   a second plug-in network device; and
   a network management system, wherein:
   the second plug-in network device is configured to send a first mesh pairing request to the first plug-in network device;
   upon receiving the first mesh pairing request, the first plug-in network device is configured to send, through a front-facing antenna, a first acknowledgment and a second mesh paring request to the second plug-in network device;
   upon receiving the second mesh pairing request, the second plug-in network device is configured to return a second acknowledgement to the first plug-in network device;
   upon receiving the second acknowledgement, the first plug-in network device is configured to transmit, through an up-facing antenna, a report indicating pairing of the first and second plug-in network devices to the network management system; and
   in response to receiving the report, the network management system is configured to establish a wireless communication pairing link between the first plug-in network device and the second plug-in network device.

9. The system of claim 8, wherein, to send the first mesh pairing request, the second plug-in network device is further configured to send the first mesh pairing request in response to the second plug-in network device being powered on.

10. The system of claim 8, wherein the first mesh pairing request includes identification information of the second plug-in network device.

11. The system of claim 8, wherein, to send the first mesh pairing request, the second plug-in network device is further configured to send the first mesh pairing request through a front-facing antenna of the second plug-in network device.

12. The system of claim 8, wherein the second mesh pairing request includes identification information of the first plug-in network device.

13. The system of claim 8, further comprising an antenna signal shield between the front-facing antenna and the up-facing antenna of the first plug-in network device.

14. The system of claim 8, wherein the report includes identification information of the first and second plug-in network devices.

15. A non-transitory computer-readable device having instructions stored thereon that, when executed by at least one computing device, cause the at least one computing device to perform operations comprising:
   receiving, by a first plug-in network device, a first mesh pairing request from a second plug-in network device;
   in response to receiving the first mesh pairing request, sending, through a front-facing antenna of the first plug-in network device, a first acknowledgment and a second mesh paring request to the second first plug-in network device;
   receiving, by the first plug-in network device, a second acknowledgement from the second plug-in network device; and
   in response to receiving the second acknowledgement, transmitting, through an up-facing antenna of the first plug-in network device, a report indicating pairing of the first and second plug-in network devices to a network management system configured to establish a wireless communication pairing link between the first plug-in network device and the second plug-in network device.

16. The non-transitory computer-readable device of claim 15, wherein the first mesh pairing request includes identification information of the second plug-in network device.

17. The non-transitory computer-readable device of claim 15, wherein the report includes identification information of the first and second plug-in network devices.

18. The non-transitory computer-readable device of claim 15, wherein the second mesh pairing request comprises identification information of the first plug-in network device.

19. The non-transitory computer-readable device of claim 15, wherein the first plug-in network device comprises an antenna signal shield between the front-facing antenna and the up-facing antenna.

20. The non-transitory computer-readable device of claim 15, wherein receiving the first mesh pairing request comprises sending the first mesh pairing request through a front-facing antenna of the second plug-in network device.

* * * * *

UNITED STATES PATENT AND TRADEMARK OFFICE
CERTIFICATE OF CORRECTION

| | | |
|---|---|---|
| PATENT NO. | : 11,706,841 B2 | Page 1 of 1 |
| APPLICATION NO. | : 17/099136 | |
| DATED | : July 18, 2023 | |
| INVENTOR(S) | : Chen et al. | |

It is certified that error appears in the above-identified patent and that said Letters Patent is hereby corrected as shown below:

In the Drawings

On Sheet 6 of 7, FIG. 6, Tag 606, Line 2, delete "paring" and insert -- pairing --, therefor.

On Sheet 6 of 7, FIG. 6, Tag 612, Line 1, delete "paring" and insert -- pairing --, therefor.

In the Specification

In Column 12, Line 62, delete "($\pi/2$" and insert -- (-$\pi/2$ --, therefor.

In Column 23, Line 4, delete "paring" and insert -- pairing --, therefor.

In Column 23, Line 12, delete "paring" and insert -- pairing --, therefor.

In Column 23, Line 44, delete "paring" and insert -- pairing --, therefor.

In Column 23, Line 52, delete "paring" and insert -- pairing --, therefor.

In Column 23, Line 54, delete "paring" and insert -- pairing --, therefor.

In the Claims

In Column 25, Claim 1, Line 66, delete "paring" and insert -- pairing --, therefor.

In Column 26, Claim 8, Line 45, delete "paring" and insert -- pairing --, therefor.

In Column 27, Claim 15, Line 23, delete "paring" and insert -- pairing --, therefor.

Signed and Sealed this
Eighth Day of April, 2025

Coke Morgan Stewart
*Acting Director of the United States Patent and Trademark Office*